US009548815B2

(12) United States Patent
Roberts et al.

(10) Patent No.: US 9,548,815 B2
(45) Date of Patent: Jan. 17, 2017

(54) APPARATUS FOR VISIBLE LIGHT COMMUNICATIONS IN ACCORDANCE WITH UFSOOK AND FSK DIMMING

(71) Applicant: Intel Corporation, Santa Clara, CA (US)

(72) Inventors: Richard D. Roberts, Hillsboro, OR (US); Praveen Gopalakrishnan, Hillsboro, OR (US); Mathys C. Walma, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/131,661

(22) Filed: Apr. 18, 2016

(65) Prior Publication Data

US 2016/0315702 A1    Oct. 27, 2016

Related U.S. Application Data

(63) Continuation of application No. 13/539,351, filed on Jun. 30, 2012.

(51) Int. Cl.
| | |
|---|---|
| *H04L 27/12* | (2006.01) |
| *H04B 10/116* | (2013.01) |
| *H04B 10/50* | (2013.01) |
| *H04L 27/04* | (2006.01) |

(52) U.S. Cl.
CPC .......... *H04B 10/116* (2013.01); *H04B 10/502* (2013.01); *H04L 27/04* (2013.01); *H04L 27/12* (2013.01)

(58) Field of Classification Search
CPC .......... H04L 27/10; H04L 27/12; H04L 27/14; H04L 27/144
USPC .......... 375/272, 275, 303, 334, 335
See application file for complete search history.

(56) References Cited

U.S. PATENT DOCUMENTS

| 4,759,080 A * | 7/1988 | Emura | H04B 10/60 |
| | | | 375/334 |
| 8,369,442 B2 * | 2/2013 | Vassilieva | H04B 10/532 |
| | | | 342/137 |
| 2014/0308048 A1 | 10/2014 | Roberts et al. | |

* cited by examiner

*Primary Examiner* — Kevin Kim
(74) *Attorney, Agent, or Firm* — Schwegman Lundberg & Woessner, P.A.

(57) ABSTRACT

Embodiments may provide a way of communicating via an electromagnetic radiator, or light source, that can be amplitude modulated such as light emitting diode (LED) lighting and receivers or detectors that can determine data from light received from the amplitude modulated electromagnetic radiator. Some embodiments may provide a waveform in the form of chips at a chipping clock frequency that switch a light source between on and off states to communicate via light sources that can be amplitude modulated such as LED lighting. Some embodiments may provide a method of transmitting the waveform via modulated LED lighting. Some embodiments are intended for indoor navigation via photogrammetry (i.e., image processing) using self-identifying LED light anchors. In many embodiments, the data signal may be communicated via the light source at amplitude modulating frequencies such that the resulting flicker is not perceivable to the human eye.

22 Claims, 4 Drawing Sheets

APPARATUS FOR VISIBLE LIGHT COMMUNICATIONS IN ACCORDANCE WITH UFSOOK AND FSK DIMMING

BACKGROUND

The present disclosure relates generally to communication technologies. More particularly, the present disclosure relates to transmitting data by varying a frequency of amplitude-modulation of an electromagnetic radiator to generate, e.g., light and receiving the data by undersampling frequencies of modulation of the, e.g., light.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Embodiments relate to communicating data by varying a frequency of an amplitude modulated electromagnetic radiator, or light source. Embodiments may comprise logic such as hardware and/or code to vary a frequency of an amplitude-modulated light source such as a visible light source, an infrared light source, or an ultraviolet light source. For instance, a visible light source such as a light emitting diode (LED) may provide light for a room in a commercial or residential building. The LED may be amplitude modulated by imposing a duty cycle that turns the LED on and off. In some embodiments, the LED may be amplitude modulated to offer the ability to adjust the perceivable brightness, or intensity, of the light emitted from the LED. Embodiments may receive a data signal and adjust the frequency of the light emitted from the LED to communicate the data signal via the light. In many embodiments, the data signal may be communicated via the light source at amplitude modulating frequencies such that the resulting flicker is not perceivable to the human eye.

Embodiments may provide a waveform in the form of chips that switch a electromagnetic radiator between on and off states at a chipping clock frequency to communicate via electromagnetic radiators that can be amplitude modulated such as LED lighting. Some embodiments may provide a way to provide a method of transmitting/encoding data via modulated LED lighting and other embodiments may provide receiving/decoding data from the modulated LED lighting by means of a device with a low sampling frequency such as a relatively inexpensive camera (as might be found in a smart phone). Such embodiments overcome some issues related to the sampling rate of the camera being very low (typically 100 frames per second or less) and avoidance of modulation of LED lighting that may cause noticeable or perceivable flicker to the human eye. Some embodiments are intended for indoor navigation via photogrammetry (i.e., image processing) using self-identifying LED light anchors and can be useful for markets involving, e.g., indoor navigation capabilities like "smart shopping".

Embodiments may encode bits of data via frequency shift keying of a repetitive ON/OFF keying waveform and applying the waveform or signal to a driver of the light source to adjust the frequency of modulation of the light source based upon the changes in the frequency of the waveform. The frequency range of the ON/OFF keying can be high enough to prevent flicker (e.g., greater than 100 Hz) but when sampled (more precisely subsampled at a rate below the Nyquist rate) by, e.g., a smart phone camera, the data modulation aliases to frequency components that can be image processed (over the duration of a short video or a series of images) to decode the modulation information.

Some embodiments receive data from a source device, such as a light source identification number, to repeatedly transmit and several of these embodiments store the data in memory. In many embodiments, the data may be received in the form of bits, the bits may be converted to chips to produce a waveform, and the chips may be stored in memory. Several of these embodiments may output the chips in a sequence indicative of the data at a chipping clock frequency associated with the chips.

Other embodiments may receive chips representing a start frame delimiter frequency, a space frequency, and a mark frequency, and, in many of such embodiments, selection logic may output the chips from memory at a chipping clock frequency. In some embodiments, selection logic may select the between chips representing the start frame delimiter frequency, the space frequency, and the mark frequency, based upon data received from a source device. Many embodiments store the chips in memory.

Further embodiments may comprise chips logic to generate chips representative of the data comprising chips representative of the start frame delimiter frequency, the space frequency, and the mark frequency. The chips logic may generate the chips based upon the relationship of the chips with the start frame delimiter frequency, the space frequency, and the mark frequency. For instance, the start frame delimiter frequency may be $(N\pm0.25)*Fsample$, wherein N is an integer and Fsample is the sampling frequency anticipated for the receiving device. In some embodiments, for example, Fsample may be the video frame rate for the camera of the receiving device. The space frequency may be $(N)*Fsample$ and the mark frequency may be $(N\pm0.5)*Fsample$. The chips logic may determine chips that, when switching the light source between on and off states, will maintain a direct current (DC) average value of zero. In many embodiments, the chips logic may also maximize the performance of the communication of data from the light source to a receiving device by minimizing the error rate.

In several embodiments, the chips logic may maintain the DC average value of zero by shifting between the start frame delimiter frequency, the space frequency, and the mark frequency at zero crossings of the waveform of the generated chips to switch the light source to communicate the data. In other words, the frequency shifts may occur halfway between the minimum and maximum values of the waveform so that no DC component value is added to the intensity of the light, which may increase the average intensity or lumens produced by the light source as a result of applying the data.

In many embodiments, the chips logic may produce a start frame delimiter that is twice the duration of a bit. For instance, in such embodiments, if a bit comprises two frames, the start frame delimiter would comprise four frames, which would represent two bit durations of samples captured by the receiving device. The number of chips generated per frame may be determined based upon an oversampling ratio.

In further embodiments, the chips logic may generate chips to produce a waveform that supports a maximum bit rate of half of the sampling frequency (Fsample) of the receiving device. In other embodiments, imposing the requirement that an even integer number of cycles are provided per bit may support lower bit rates.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Wireless embodiments may integrate low power wireless communications like Bluetooth®, wireless local area networks (WLANs), wireless metropolitan area networks (WMANs), wireless personal area networks (WPAN), cellular networks, and/or Institute of Electrical and Electronic Engineers (IEEE) standard 802.15.4, "Wireless Medium Access Control (MAC) and Physical Layer (PHY) Specifications for Low Rate Wireless Personal Area Networks (LR-WPANs)" (2006) (http://standards.ieee.org/getieee802/download/802.15.4-2006.pdf), communications in networks, messaging systems, and smart-devices to facilitate interaction between such devices. Furthermore, some wireless embodiments may incorporate a single antenna while other embodiments may employ multiple antennas. For instance, multiple-input and multiple-output (MIMO) is the use of multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
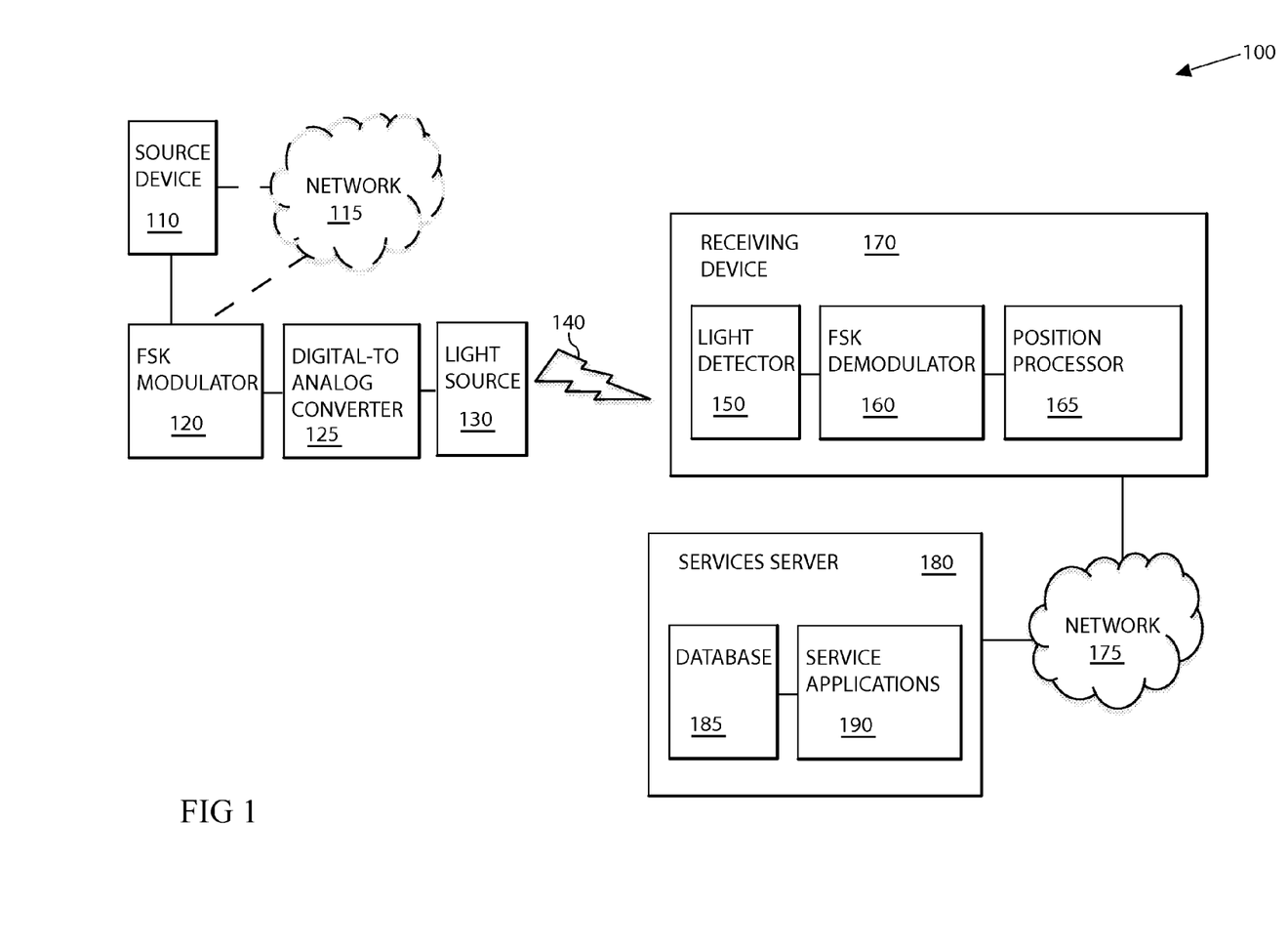
FIG. 1 depicts an embodiment of a system including devices to transmit and to receive data communicated by varying a modulation frequency of an amplitude-modulated light source.

Turning now to FIG. 1, there is shown an embodiment of a system 100 system including devices to transmit and to receive data communicated by varying a modulation frequency of an amplitude-modulated light source. System 100 comprises a source device 110, a network 115, a frequency shift keying (FSK) modulator 120, a digital-to-analog converter 125, a light source 130 to transmit light 140, a light detector 150, an FSK demodulator 160, and a receiving device 170. System 100 also includes a network 175 communicatively coupling the receiving device 170 and a services server 180 to facilitate services such as "smart shopping". System 100 may communicate data originating from the source device 110 to the receiving device 170 wirelessly via the light source 130. For example, the light source 130 may be a visible light source to provide light for areas within a shopping mall. The light source 130 may provide an identification number, or unique number, as a bit sequence that may facilitate a determination of the location of the receiving device 170 within the shopping mall. In many embodiments, the receiving device 170 may simultaneously receive modulated light from multiple light sources such as the light source 130 to facilitate determining the location of the receiving device 170 by, e.g., triangulation.

The source device 110 may couple with the FSK modulator 120 to provide data to the FSK modulator 120 to transmit via the light source 130. The source device 110 may transmit a data signal to the FSK modulator 120 so the data may be transmitted to the receiving device 170. In many embodiments, the source device 110 may digitally modulate or otherwise transmit the data to the FSK modulator 120. The data may comprise one or more repetitions of the data, or bit sequence, to be communicated from the light source 130 to the receiving device 170. The FSK modulator 120 may store the data in memory within or coupled with the FSK modulator 120 such as read only memory (ROM). In some embodiments, the source device 110 may comprise a processor-based device such as a desktop computer, a notebook, a laptop, a Netbook, a smartphone, a server, or the like that is capable of transmitting a data signal to the FSK modulator 120. In further embodiments, the source device 110 may be integrated with the FSK modulator 120 or both the source device 110 and the FSK modulator 120 may comprise parts of another device.

In some embodiments, the source device 110 may comprise a bit shift circulating register to shift bits comprising an identification number (a bit sequence) that is unique for the light source 130 through a series of registers in order and to the FSK modulator 120. In some embodiments, however, the uniqueness of the identification number may be relative to nearby light sources. In many of these embodiments, the order and content of the bits of the data may establish the timing of frequency changes to the amplitude modulation of light emitted from the light source 130.

In an alternative embodiment, as indicated by the dashed lines, the source device 110 may comprise a local network interface to communicatively couple the source device 110 with the FSK modulator 120 via the network 115. For instance, the network 115 may comprise a physical and/or wireless network such as a corporate intranet, wireless local area network (WLAN), a local area network (LAN), or other network capable of communicating data between devices. In some embodiments, the network 115 may comprise a distinct network from the network 175 in a physical or logical sense to, e.g., separate business operations from public operations. In some of these embodiments, both networks 115 and 175 may couple with a larger network such a metropolitan area network or the Internet.

In further embodiments, the source device 110 may comprise chips logic to generate chips representative of the data to generate a waveform with the chips via the light source 130. The chips may comprise a partial representation of a bit. For instance, one bit may comprise 360 chips in some embodiments. In such embodiments, the source device 110 may transmit a sequence of chips to the FSK modulator 120 that represents the data to transmit via the light source 130. And the receiving device 170 may capture several samples per frame of video for light sources captured in the frame and extract a sample per frame from two or more frames of video to determine the value of the bit transmitted by the light source 130.

In other embodiments, the chips logic may not be part of the source device 110. The chips logic may receive the data from the source device 110, may generate a sequence of chips based upon the data, and may transmit the sequence of chips to the FSK modulator 120. In further embodiments, the chips logic may be part of the FSK modulator 120 or at least part of the chips logic may reside in the FSK modulator 120.

The FSK modulator 120 may receive the data signal from the source device 110 and couple with the digital-to-analog converter 125 to modulate the light 140 emitted by the light source 130 in a pattern that facilitates communication of data from the data signal. The FSK modulator 120 may communicate by modulating logical ones and zeros at different frequencies. In many embodiments, the FSK modulator 120 may receive the data signal and store the data signal. For embodiments in which the data signal has already been translated into chips, the FSK modulator 120 may repeatedly output the chips at a chipping clock frequency to generate a digital waveform indicative of the data and transmit the digital waveform to the digital-to-analog converter 125. For example, after the FSK modulator 120 receives the data from the source device 110 and stores the data received as a bit sequence in memory such as ROM, the FSK modulator 120 may repeatedly transmit the bit sequence in the form of a digital waveform of chips via a digital-to-analog converter (DAC) 125.

For embodiments in which the data signal has not been translated into chips, the FSK modulator 120 may comprise chips logic to generate the sequence of chips based upon the data, store the sequence of chips in memory, and output the sequence of chips at the chipping clock frequency. In some embodiments, the FSK modulator 120 may generate, in response to receipt of bits of the data, a waveform of chips representative of a space frequency to communicate a logical zero, generate a waveform of chips representative of a mark frequency to communicate a logical one, and generate a waveform of chips representative of a start frame delimiter frequency to communicate a start frame delimiter. The digital-to-analog converter 125 may then modulate the frequency of amplitude modulation of the light 140 at the frequencies established by the waveform to drive the light source to communicate the data via the light 140 emitted from the light source 130.

The FSK modulator 120 may transmit the same waveform repeatedly to facilitate receipt of the data by the receiving device 170. For instance, the FSK modulator 120 may transmit the data to the receiving device 170 multiple times and consecutively to allow the receiving device 170 to sample the modulated frequencies of the amplitude-modulated light multiple times for each bit at a sampling frequency that is lower than or equal to the space frequency or the mark frequency.

In many embodiments, the FSK modulator 120 may generate a waveform based upon the chips comprising specific tones such as one times (1×) the sampling frequency, one point two-five times (1.25×) the sampling frequency, one point five times (1.5×) the sampling frequency, one point seven-five times (1.75×) the sampling frequency, two times (2×) the sampling frequency, two point two-five times (2.25×) the sampling frequency, and the like. In several embodiments, the space frequency may be a harmonic frequency or overtone frequency of the sampling frequency and the mark frequency may be halfway between the harmonic or overtone frequencies. For example, the space frequency may be 1× the sampling frequency and the mark frequency may be 1.5× the sampling frequency. In another embodiment, the space frequency may be 1.5× the sampling frequency and the mark frequency may be 2× the sampling frequency. In other embodiments, the frequencies defined for or associated with the mark and space frequencies may be reversed.

In many embodiments, the FSK modulator 120 may generate a waveform based upon the chips comprising a delimiter frequency prior to each repetition of the transmission of the data to delimit or demark the start of a data transmission and/or the end of a data transmission. For example, the FSK modulator 120 may generate the waveform comprising chips representative of a delimiter frequency that is between the space frequency and the mark frequency. In many embodiments, the delimiter frequency may be halfway between the space frequency and the mark frequency such as 1.25× the sampling frequency, 1.75× the sampling frequency, 2.25× the sampling frequency, or the like. In several embodiments, the chips logic generates chips representative of the start frame delimiter. In further embodiments, the chips logic may generate two or more chips of alternating values, or at least of an equal number of low chip values and high chip values, immediately prior to the chips representative of the start frame delimiter. In other embodiments, the FSK modulator 120 may insert a predetermined pattern of chips for the chips preceding the start frame delimiter and, in further embodiments, for the start frame delimiter also.

For embodiments that utilize a visible light source 130, the light 140 may be modulated at frequencies that are not visible to the human eye such as a frequency above 60 Hertz (Hz) or, in many embodiments, above 100 Hz. For instance, if the sampling frequency of the receiving device 170 is 60 Hz then the FSK modulator 120 may produce the waveform with the space frequency at 60 Hz, the delimiter frequency at 75 Hz, and the mark frequency at 90 Hz. In other embodiments, the FSK modulator 120 may generate the waveform with the space frequency at a minimum of 120 Hz, the delimiter frequency at a minimum of 135 Hz, and the mark frequency at a minimum of 150 Hz.

The FSK modulator 120 may modulate the light 140 emitted from the light source 130 via the digital-to-analog converter 125 by switching the power to the light source 130 to turn the light 140 on and turn the light 140 off at the frequency of the waveform, referred to as the chipping clock frequency. The light source 130 may comprise an electromagnetic radiator that can be amplitude modulated such as a light emitting diode. The amount of data that may be communicated via, e.g., a visible light source without producing flicker perceivable by a human eye can vary based upon the speed with which the light source 130 can be amplitude modulated as well as the speed with which the receiving device 170 can capture and process samples from the light 140. In some embodiments, the light source 130 may comprise a visible light source. In some embodiments, the light source 130 may comprise an infrared light source. And, in some embodiments, the light source 130 may comprise an ultraviolet light source.

The light source 130 illustrated in FIG. 1 may be one light source of many light sources. For instance, the light source 130 may be a light source in one light fixture of many light fixtures in a shopping mall. In some embodiments, more than one of the light fixtures may comprise light sources transmitting the same data. For example, a department store may have hundreds of light fixtures. Each light fixture, every other light fixture, or periodic fixtures may comprise a light source like light source 130 that can be amplitude modulated and each of those light sources may transmit a unique identification number, or identifier. The receiving device 170 may be a smart phone of a user looking for a particular item within the department store and the user may wish to find a particular item in the store. In the department store, the light sources may repeatedly transmit their respective identification numbers, such as 10 bit identification codes. Upon entering the department store, the receiving device 170 may begin to receive the transmissions of the identification numbers from the light sources. The receiving device 170 may process the signals to determine the frequency modulations and associate the frequency modulations with the identification numbers for a number of the light sources. The receiving device 170 may transmit the identification numbers to the services server 180 via the network 175 and, in response, the receiving device 170 may receive an indication of the location, such as a three dimensional location, of the receiving device 170 and/or the location of the particular item within the department store with respect to the location of the receiving device 170 and the user.

The light source 130 emits modulated light 140 with the data from the data signal at a location at which the light detector 150 can receive the light 140. In many embodiments, the user may be walking through the store or mall while the user's smart phone or tablet is receiving packets from light sources such as light source 130. However, the user's smart phone must be in a position that allows the camera of the smart phone to capture light emanated from the light source 130 at least long enough for the smart phone to capture frames representative of a complete packet of data.

The receiving device 170 may comprise a hardware device to interact with a user of the receiving device 170. In many embodiments, the receiving device 170 may be a portable device such as a portable data assistant, a smart phone, a camera, a laptop, a notebook, a netbook, an iPad, an iPhone, or the like. The receiving device 170 comprises a light detector 150 and an FSK demodulator 160 to receive and interpret the frequency-modulated light from the light source 130 and other such light sources by undersampling the modulated light emitted by the light sources such as light source 130. In many embodiments, the receiving device 170 also comprises a position processor 165 to determine the position of the receiving device 170 based upon the identification numbers of the light sources identified by the FSK demodulator 160.

The light detector 150 may convert the light 140 into an electrical signal, such as a pixel of an image representative of the light 140 or a current of a photo diode. For example, the light detector 150 may comprise a camera or an array of photo detectors. The light detector 150 may capture an image of light sources including light source 130 and may comprise storage logic (not shown) to store the image to a storage medium such as dynamic random access memory (DRAM), a flash memory module, a hard disk drive, a solid-state drive such as a flash drive or the like.

The light detector 150 may also comprise sample logic to determine samples of the waveform of frequency modulation of the amplitude-modulated light from video images captured by the light detector 150. For instance, the sample logic may identify pixels from the image associated with light sources to identify the light sources and may determine the state of the identified light sources, i.e., whether the image indicates that a light source is emitting light (the light source is on) or the light source is not emitting light (the light source is off). In some embodiments, the sample logic may receive a value for a light source from the photo detector such as a voltage or a current that is indicative of the energy captured from the light source 130 within the particular frame that is captured by the light detector 150. The sample logic may then determine a sample index based upon a determined state of the light source 130 in the particular frame such as a sample index of one (1) when the light source 130 is in the on state and a sample index of negative one (−1) when the light source 130 is in the off state. In many embodiments, the sample logic may also determine a variance associated with the value in the frame or in multiple frames indicative of a range of the energy received by the photo detector from the light source 130 in the frame or frames. Repeat decoding logic 162 may utilize the variance or variances associated with a packet of data received from the light source 130 to facilitate bit decisions. In other embodiments, the sampling logic may comprise part of the FSK demodulator 160 or otherwise be independent of and coupled with the light detector 150.

The light detector 150 may capture images at a sampling frequency frame rate (Fsample). The sampling frequency may be a limitation of the receiving device 170 in some embodiments and may be a setting of the receiving device 170 in other embodiments. In further embodiments, another signal or user notification may indicate the sampling frequency for which the FSK modulator 120 is configured and the receiving device 170 may adjust the sampling frequency of the light detector 150 to match that sampling frequency either automatically or with some interaction with the user.

The light detector 150 may sample or capture samples indicative of the frequency of the amplitude-modulated light 140 at the sampling frequency, undersampling the signal transmitted via the light 140. This process of undersampling effectively aliases the frequency of the signal transmitted via the light 140 to a lower frequency. For embodiments in which the first frequency is an integer multiple (N*Fsample) of the sampling frequency and the second frequency is an integer plus one half multiple (N+½)*Fsample, which is a harmonic or overtone of the sampling frequency, the sample logic captures samples of the first frequency that appear to be at a frequency that is at zero Hz and samples of the second frequency that appear to be at a frequency that is half of the sampling frequency.

The FSK demodulator 160 couples with the light detector 150 to receive the sample indexes and variances, to determine the bit or bits represented by the light, to improve the accuracy or reduce the packet error rate associated with decoding the packet from the light source 130 via, e.g., repeat decoding, and to output the bits to, e.g., the services server 180. As a result of the undersampling, the space frequency may appear to the FSK demodulator 160 to be approximately a waveform at zero Hz with an assigned value that is either the minimum value, e.g., −1, or the maximum value, e.g., 1, throughout the waveform. The mark frequency may appear to the FSK demodulator 160 to be approximately a signal with the frequency of the sampling frequency divided by two, alternating between a high and a low value. And the delimiter frequency, which may be approximately halfway between the space frequency and the mark frequency, may appear to be at half the frequency of the second frequency, switching between the minimum value and the maximum value at half the speed of the mark frequency and including two lows and two highs. For instance, depending upon the time at which the sampling begins, the delimiter frequency may provide one of four patterns of samples including: (1) Low-Low-High-High, (2) High-High-Low-Low, (3) Low-High-High-Low, and (4) High-Low-Low-High. In other embodiments, the frequencies associated with the space and mark frequencies may be reversed.

In many embodiments, this delimiter may be preceded by two frames of light emission in which the light is "half on" (appears half bright). Embodiments may accomplish the transmission of these "half on" frames in several ways. For example, one feasible method is to transmit a very rapid on and off sequence for two frames, at such a pulsing rate that the receiving device 170 cannot, or otherwise does not, follow the individual light levels at the sampling frequency of the light detector 150 and only senses the average value.

The FSK demodulator 160 may process the samples to determine frequency components of the waveform transmitted by the light source 130. In some embodiments, the frequency components may be determined by performing a Fourier transform on the samples received from the light detector 150. For example, the FSK demodulator 160 may perform a fast Fourier transform (FFT) to determine the amplitudes of the waveforms at various frequencies and may make bit decisions incoherently using only the FFT amplitudes to associate the frequency modulations of the light with bits of data. The number of points in the FFT is dependent upon the data rate. In one embodiment, the FSK demodulator 160 may perform a four point FFT. The four point FFT is used when operating at the highest data rate for sampling, which is BIT_RATE=Fsample/2. For embodiments in which the highest bit rate may not be used, such as BIT_RATE=Fsample/10, the number of points in the FFT would be more than four. Other embodiments may use a discrete Fourier transform (DFT) in lieu of the FFT.

The FSK demodulator 160 may begin by processing the sample indexes received from the sampling logic of the light detector 150 to determine a location of a start frame delimiter, or the delimiter frequency, for the packet received from or being received from the light source 130. As a result of the repeated transmissions of the packet of data from the light source 130, packets may comprise a constant number of sample indexes and the sample indexes representative of the delimiter frequency will reside at some location within each packet that depends upon the portion of the packet being transmitted at the time that the light detector 150 begins to capture frames comprising samples of the light source 130. For example, if a packet comprises 24 frames and the start frame delimiter is present in four of the 24 frames, the FSK demodulator 160 may begin by processing successive groups of four consecutive sample indexes until a pattern of sample indexes is found that is indicative of the start frame delimiter.

Once the FSK demodulator 160 determines the location of the start frame delimiter in each of the one or more packets, the FSK demodulator 160 may decode the bits of the packet by reviewing the sample index values starting with the sample index immediately following the start frame delimiter. For instance, the packet with 24 sample indexes may comprise two sample indexes per bit so the FSK demodulator 160 may determine the bits of the packet by associating the frequency components identified with a logical zero or a logical one. By determining the bits of the packet, the FSK demodulator 160 may determine the identification number associated with the light source 130.

The receiving device 170 may also comprise a position processor 165. The position processor 165 may determine the position of the receiving device 165 based upon the identification numbers determined by the FSK demodulator 160. For example, the light source 130 may comprise one of many light sources in a warehouse. The light sources may transmit their respective identification numbers and the position processor 165 may receive the identification numbers from the receiving device 170. The particular identification numbers identified by the receiving device 170 and, in some embodiments, the timing of receipt of the identification numbers, may provide information to the position processor 165 to identify the location of the receiving device 170. In some embodiments, this data may also provide the direction of movement of the receiving device 170. In particular, the position processor 165 may interact with the services server 180 to obtain data about the light sources associated with the identification numbers from the database 185.

In some embodiments, the position processor 165 may compare the identification numbers received from the FSK demodulator 160 against identification numbers stored in the database 185, associate the identification numbers with the locations of the light sources such as light source 130 and determine the specific location of the receiving device 170 based upon the locations of the light sources identified by the identification numbers via database 185. The receiving device 160 may communicate with the services server 180 to obtain services such as directing the user of the receiving device 170 to a particular object in the warehouse, a particular location of interest in the warehouse, showing a map of the warehouse with the user's current location, showing the location of another receiving device in the warehouse, or other service that relates to the users location or the location of a receiving device.

The receiving device 170 may obtain the services by, e.g., downloading one or more service applications 190, downloading maps, requesting location information for particular items or other locations of interest, downloading part or all of the database 185, or the like. In one embodiment, the location information for the light sources such as the x,y,z coordinates of the light source 130 may be downloaded or at least begin to be downloaded by the receiving device 170 upon entering a facility offering such services. In some embodiments, the receiving device 170 may provide the location of the receiving device 170 to the services server 180 to obtain services. In alternative embodiments, the receiving device 170 may provide the identification numbers for the light sources such as light source 130 to the services server 180 to obtain the location of the receiving device 170 and/or services for the user of the receiving device 170.

The database 185 may comprise identification numbers and associated location information such as the x,y,z coordinates of the light sources. Based upon this information, the location processor 165 may calculate the location of the receiving device 170. In other embodiments, the results of calculations for locations of the receiving device 170 in the warehouse may be stored in the receiving device 170 for future reference. In several embodiments, the potential locations of the receiving device 170 may be predetermined so that the database 185 contains location information for the receiving device 170 associated with groups of identification numbers. The location processor 165 may look up the location of the receiving device 170 based upon the identification numbers provided by the FSK demodulator 160. In still other embodiments, the locations of the receiving device may be partially calculated and stored in the database 185 and, in some of these embodiments, the partial calculations may be downloaded to the receiving device 170.

Figure 2:
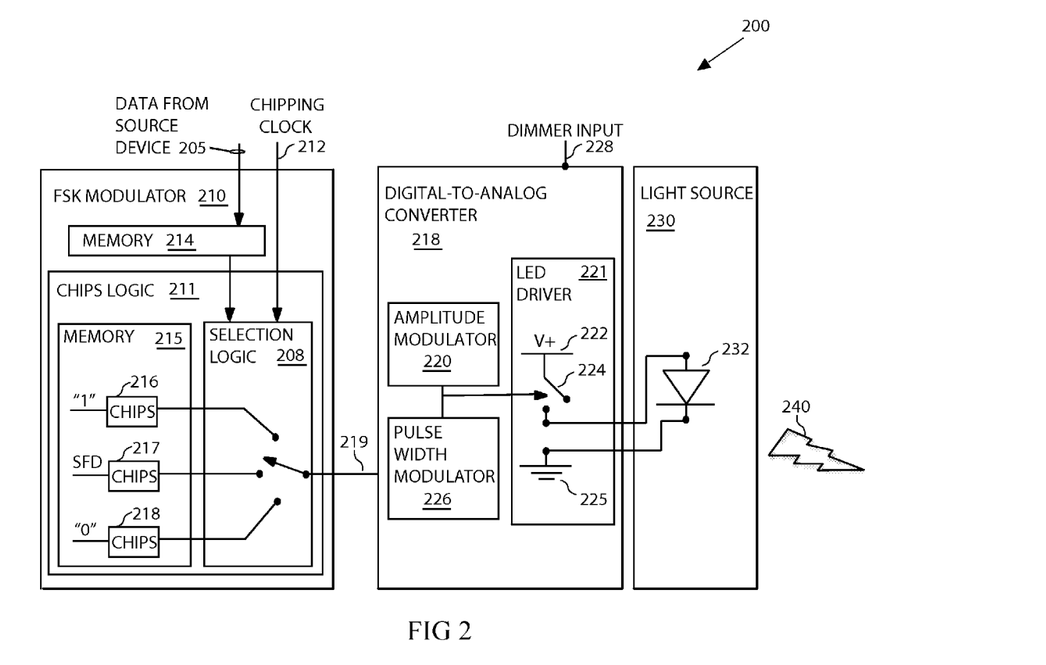
FIG. 2 depicts an embodiment of apparatuses to transmit data communicated by varying a modulation frequency of amplitude-modulation of a light source.

FIG. 2 depicts an embodiment of apparatuses 200 to transmit data 205 communicated by varying a modulation frequency of amplitude modulation of a light source 230. For instance, lighting in a department store may communicate data to smart devices such as smart phones of customers to provide information about special sales or to offer coupons for products.

Apparatuses 200 comprise an FSK modulator 210, a digital-to-analog converter 218, and a light source 230 to produce light 240. The FSK modulator 210 may modulate the frequency of amplitude modulation of the light 240 based upon the data from the source device 205 and the frequency of the chipping clock 212. The FSK modulator 210 may comprise memory 214 to store the data from the source device and chips logic 211 to determine and output a waveform 219 of a sequence of chips representative of the data from the source device 205. The memory 214 may comprise volatile or non-volatile memory such as random access memory, read only memory, flash memory, or any other type of storage medium.

The chips logic 211 may receive the data 205 from the memory 214 and generate a waveform of chips based upon the data 205. The chips logic 211 comprises memory 215 and selection logic 208. The memory 215 may comprise volatile or non-volatile memory such as random access memory, read only memory, flash memory, or any other type of storage medium.

The memory 215 may store patterns of chips 216-218 representative of bits of the data 205. In further embodiments, the memory 215 or the chips 216-218 may comprise one or more integrated circuits that maintain sequences of two or more chips for each frequency. To reproduce the signal, the chips may be transmitted at a high clock rate such as the chipping clock 212 frequency. For embodiments in which the chips 216-218 comprise one or more integrated circuits, the chipping clock 212 may be applied or input into the integrated circuit(s) to output the appropriate sequences of chips 216-218 in an order indicative of the data from the source device 205. Note that the associations of the logical 1 with chips 216 and the logical 0 with chips 218 are for the purposes of illustration only and these logical bit associations can be reversed in some embodiments.

In the present embodiment, the selection logic 208 may select the chips 216, 217, or 218 corresponding bit(s) received from memory 214 and output the chips 216, 217, or 218 as a waveform 219 at the frequency of the chipping clock 212. In many embodiments, the chips logic 211 may precede the output of chips 217 of a start frame delimiter with two or more chips that are modulated at a high frequency such that the light 240 appears, to the receiving device that samples the light 240 at a sampling frequency (Fsample), to be at half the intensity or at the average intensity between the maximum intensity and the minimum intensity being output by the light 240.

After outputting the chips 217 of the start frame delimiter, the selection logic 208 may select between the chips 216 of a mark frequency that represent a logical 1 and the chips 218 of a space frequency that represent a logical zero based upon the data stored in the memory 214. Thereafter, the chips logic 211 may repeat the transmission of the data from the source device 205 by sequentially receiving the data from the memory 214. The FSK modulator 210 may repeat the transmission of the waveform 219 continuously or in sets of a particular number of repeated transmissions.

The waveform 219 may be a digital waveform based upon the chips 216-218 and, in some embodiments, may not be appropriate or otherwise ideal for switching the light source 230 directly. In such embodiments, a digital-to-analog converter (DAC) 218 such as a single bit DAC may couple with the chips logic 211 to convert the waveform 219 by generating an analog signal to switch the light source 230 between on and off states based upon the chips representing the delimiter frequency, space frequency, and mark frequency in a sequence indicative of the data 205. In the present embodiment, the DAC 218 may comprise an amplitude modulator 220, a pulse-width modulator 226, and a light emitting diode (LED) driver 221.

The input of amplitude modulator 220 may couple with the output of the FSK modulator 210 to receive the waveform 219. The amplitude modulator 220 may apply the output signal 219 to the LED driver 221 to connect and disconnect the light source 230 from a power source 222 or otherwise cycle the light source 230 between on and off states. In the present embodiment, the LED driver 221 is illustrated as a switch 224 that opens and closes at the frequency of the output signal 219. For instance, when the switch 224 is open, the circuit between the voltage illustrated as the power source 222 and ground 225 is opened, turning off the LED 232. When the switch 224 is closed, the circuit between the voltage illustrated as the power source 222 and ground 225 is closed, drawing a current from the power source 222 through the LED 232, turning on the LED 232 to generate light 240. In some embodiments, the switch 224 may comprise one or more transistors. While the present embodiment illustrates the LED 232, embodiments may utilize any electromagnetic radiator that can be amplitude modulated and/or one or more LEDs.

The light 240 may comprise light that is modulated between two or more states such as an "off" state and an "on" state at a frequency of the waveform 219. In several embodiments, the light comprises visible light. In other embodiments, light source 230 may generate infrared light, ultraviolet light, or visible light. In further embodiments, the light source 230 may switch between two different "on" states such as a full-power state in which the full-rated current or voltage for the light source 230 is applied to the light source 230 and a half-power state in which half the rated current or voltage is applied to the light source 230 to generate the light 240. In still further embodiments, the light source 230 may comprise multiple sources such as multiple LEDs and less than all of the light sources may be turned off to create a "partially on" state for modulation.

In some embodiments, the amplitude modulator 220 comprises pulse-width modulation logic 226 to adjust the duty cycle of the light 240 or, in other words, vary the percentage of time that the light source 232 is on. For instance, the duty cycle of the light 240 without the pulse-width modulation logic 226 may be at 50 percent. The 50 percent duty cycle means that the light 240 generated by the LED 232 is on 50 percent of the time and off 50 percent of the time. The effect of the 50 percent duty cycle is that the intensity of the light 240 is half of the intensity if the LED 232 were turned on 100 percent of the time, i.e., no amplitude modulation. The pulse-width modulation logic 226 may adjust the percentage of time that the light source 230 is on during the duty cycle to provide a dimming circuit for the light source 230. For example, the pulse-width modulation logic 226 may be adjustable via a knob or switch for the light source 230 so a user may dim the light 240 or increase the brightness or intensity of the light 240 via a dimmer input 228 while the light 240 is still modulated at the frequency of the waveform 219.

In some embodiments, the amplitude modulator 220 may overdrive the LED 232 so that the light brightness is not derated by the modulation. For example, the "Off" state may be defined as when the light 240 is at 50% illumination or intensity and the "On" state may be defined as when the light 240 is at 150% illumination. Assuming a 50 percent duty cycle, the average output of LED 232 may remain at 100 percent of the illumination.

Figure 3:
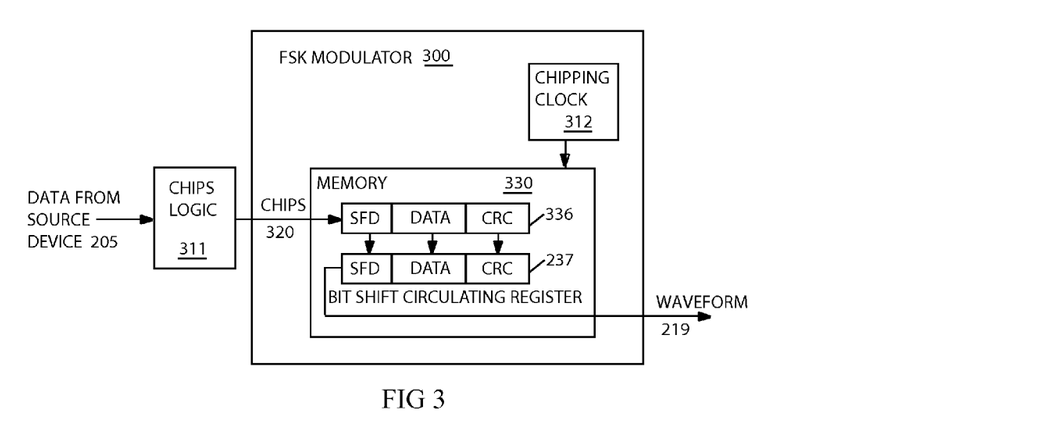
FIG. 3 illustrates one embodiment of an alternative embodiment of a frequency shift keying (FSK) modulator.

Referring to FIG. 3, there is shown an alternative embodiment of the FSK modulator 210 shown in FIG. 2 as well as an alternative embodiment of chips logic 211. In the present embodiment, the chips logic 311 resides outside of and is coupled with the FSK modulator 300. In other embodiments, the chips logic 311 may be part of, partially part of, or otherwise integrated with the FSK modulator 300.

The chips logic 311 may receive the data from the source device 205, determine a sequence of chips to output as a waveform 219 representative of the data from the source device 205, and output the waveform 219 to a digital-to-analog converter such as the digital-to-analog converter 218 in FIG. 2. The chips logic 311 may transmit chips indicative of the waveform to the FSK modulator 300, wherein the direct current (DC) average value of the waveform is zero. In many embodiments, the chips logic 311 may transmit chips indicative of the waveform to the FSK modulator 300, wherein the chips minimize the bit error rate associated with receipt of the data from the source device 205 by a receiving device.

In some embodiments, the chips logic 311 may transmit chips indicative of a start frame delimiter, which comprise chips representative of a delimiter frequency. In several embodiments, the chips logic 311 may transmit chips indicative of a space frequency for each logic zero in the data 205 and, in further embodiments, the chips logic 311 may transmit chips indicative of a mark frequency for each logic one in the data 205.

The start frame delimiter, space, and mark frequencies may be related in that space frequency may be an integer multiple of the sampling frequency, N*Fsample, wherein N is an integer (1, 2, 3, 4, 5, 6, . . . ) and Fsample is the expected sampling frequency of the light detector of a receiving device. The mark frequency may be (N+½)*Fsample, and the start frame delimiter frequency may be (N+¼)*Fsample. Or the mark frequency may be (N−½)*Fsample, and start frame delimiter frequency may be (N−¼)*Fsample. In other embodiments, the space frequency may be an integer multiple of the sampling frequency, (N+1)*Fsample, the mark frequency may be (N+½)*Fsample or (N−½)*Fsample, and the start frame delimiter frequency may be (N+¾)*Fsample or (N−¾)*Fsample. In other embodiments, the frequencies defined for or assigned to the mark and space frequencies may be reversed.

In many embodiments, the chips logic 311 may generate chips to transmit in a waveform with the direct current (DC) average value of zero by satisfying the following rules:
  a) The frequency shifting may be phase continuous at the boundaries. Many embodiments may implement this rule by changing the transmitted frequency at the waveform zero crossing.
  b) The transmitted frequency may have an integer number of cycles per bit.
  c) The SFD may have a duration that is twice that of a bit, which, in many embodiments, may be combined with a requirement that an integer number of transmitted cycles for the SFD is over two bit times.
  d) To support a maximum bit that is ½ the sampling frequency, the receiving device may capture two frames of video for every bit (i.e., the bit rate is half the camera sample rate). In further embodiments, imposing that there be an even number of samples (video frames) per bit may support lower bit rates.

In some embodiments, the chips logic 311 may determine chips representative of the data by solving by calculation, iteration, or other method, the following three equations:

$Fchipping=2*Kmark*Fmark$ $Fchipping=2*Kspace*Fspace$ $Fchipping=2*Ksfd*Fsfd$ wherein Fchipping is the frequency of the chipping clock, and the multiplier "2" imposes a minimum chipping rate that provides an even number of chips per tone, Kmark is an integer for the mark frequency (Fmark), Kspace is an integer for the space frequency (Fspace), and Ksfd is an integer for the start frame delimiter frequency (Fsfd).

In several embodiments, the amount of memory 330 needed to store the chips may be determined by determining the length of the chips representative of the data (Lrecord) as the number of chips per bit multiplied by the number of bits in the data multiplied by the oversampling ratio, wherein the oversampling ratio (OSR) is the chipping clock frequency (Fchipping) divided by the anticipated sampling frequency of the receiving device (Fsample). For example, the number of bits in the data may comprise, e.g., one bit duration (two frames) of alternating chip values to precede the start frame delimiter, two bit durations (four frames) of the start frame delimiter, and 10 bit durations (twenty frames) of the identifier code. Some embodiments may also comprise one or more bit durations of cyclic redundancy check data.

For illustration, one solution determined through an iterative search process involved a sampling frequency (Fsample) of 60 Hertz, N=2, with the SFD and MARK frequencies higher than the SPACE frequency, and yielded the following results:

$Fchipping=10800$ Hertz $OversampleRatio=180$ $Kspace=45$ $Ksfd=40$ $Kmark=36$

In many embodiments, the ratio of the chipping clock frequency (Fchipping) to each of the space, start frame delimiter, and mark frequencies may be an interger. In particular, Fchipping/Fspace is an integer, Fchipping/Fsfd is an integer, and Fchipping/Fmark is an integer.

As an illustrative example, assuming a camera frame rate: Fsample=60 (frames per second), letting the harmonic relationship be N=2, and setting the Fchipping=10800 Hz (found by iterative search above). The following results:

$Fspace=2*60=120$ Hz ($N*Fsample$)

$Fmark=2.5*60=150$ Hz ([$N+0.5$]*$Fsample$)

$Fsfd=2.25*60=135$ Hz ([$N+0.25$]*$Fsample$)

$Fchipping/Fspace=10800/120=90$ (even number)

$Fchipping/Fmark=10800/150=72$ (even number)

$Fchipping/Fsfd=10800/135=80$ (even number)

Assuming that, in some embodiments, two samples or frames are captured per bit, the number of cycles per bit for each square wave frequency is determined as follows:

Space Frequency: $2*Fspace/Fsample=2*N*Fsample/Fsample=2*N$ (for $N=2$; 4 cycles)

Mark Frequency: $2*F\text{mark}/F\text{sample}=2*(N+0.5)$
 $*F\text{sample}/F\text{sample}=2*N+1$ (for $N=2$; 5 cycles)

SFD Frequency: $4*F\text{sfd}/F\text{sample}=4*(N+0.25)$
 $*F\text{sample}/F\text{sample}=4*N+1$ (for $N=2$; 9 cycles;
 Note that the SFD is 2 bits long)

As a result, the storage requirements for memory may be:

Space Frequency→4 cycles of 120 Hertz square wave per bit with 90 chips per cycle at a chip frequency Fchipping=10800 Hz, which produces a total of 4*90=360 chips/bit.

Mark Frequency→5 cycles of 150 Hertz square wave per bit with 72 chips per cycle at a chip frequency Fchipping=10800 Hz, which produces a total of 5*72=360 chips/bit.

SFD Frequency→9 cycles of 135 Hertz square wave per SFD with 80 chips per cycle at a chip frequency Fchipping=10800 Hz, which produces a total of 9*80=720 chips/SFD (Note that the SFD is twice as long since the SFD is two bit times, also referred to as bit durations).

In sum, many embodiments may also include at least two frames of an even number of rapidly alternating chips prior to the SFD to facilitate identification of the SFD. The SFD may be 720 chips and the remaining number of bits such as the identification number and possibly a cyclic redundancy check are multiplied by 360 chips/bit. For example, if the remaining data is ten bits, the total number of chips 320 that may be stored in the memory 330 of the FSK modulator 300 is 2 frames (360 chips) (preceding SFD)+720 chips (SFD)+ 3600 chips (ten bits), which produces a total of 4680 chips. In other embodiments, the 2 frames preceding the SFD may be implemented by the FSK modulator 300 and may not need to be stored in memory 330. In other embodiments, the SFD may be implemented in the FSK modulator 300 such as chips 217 illustrated in FIG. 2 and the SFD may not need to be stored with the remaining data in memory 330. Note that in this latter embodiment, the chips logic 311 may be partially implemented outside of the FSK modulator 300 and partially implemented in the FSK modulator 300.

The FSK modulator 300 may receive the chips 320 and may maintain the chips 320, which includes an identification number of a light source, in the memory 330. In some embodiments, the memory 330 may comprise non-volatile memory such as flash memory or read only memory. In other embodiments, the memory 330 may comprise volatile memory. In many embodiments, the memory 330 comprises a unique, identification number of the light source and that identification number may be assigned at the time of manufacture of the light source. In other embodiments, the unique, identification number may be assigned upon installation or may be assigned via a data interface for a network such as network 115 of FIG. 1. In one embodiment, the identification number of a light source such as light source 230 may be indicative of the location of the light source so that a receiving device such as receiving device 170 of FIG. 1 may be able to decode or otherwise calculate the coordinates of the light source with the identification number. In another embodiment, the coordinates of the light source may be embedded in the identification number for the light source.

In the present embodiment, the memory 330 comprises chips 320 representing the "SFD", chips representing the "data" to transmit via a light source, and optionally chips representing a "CRC" cyclic redundancy check. The CRC may allow a receiving device to verify that the "data" received by the receiving device matches, to some degree of accuracy, the "data" in memory 330. Many embodiments do not include the CRC. The FSK modulator 300 copies the SFD, data, and CRC from buffer 336 into a bit shift circulating register 337 in parallel and the register 337 shifts the chips out at the frequency of the chipping clock 312 to create the waveform 219. Once all the chips are shifted out of register 337, the memory 330 copies the SFD, data, and CRC from buffer 336 into a bit shift circulating register 337 in parallel again to repeat the signal. For example, the SFD may comprise 720 chips of data that are just fillers or are chips indicative of the SFD as well as the 2 frames (360 chips) preceding the SFD. The data may comprise chips indicative of the identification number for the light source and the CRC may comprise chips indicative of a four-bit CRC such as a sum of the bits in the data.

In alternative embodiments, the memory 330 may comprise only the data and, in some embodiments, the data only comprises the identification number associated with the light source. In other embodiments, the memory 330 comprises the two frames preceding the SFD, the SFD, and the data. Other embodiments may implement different circuit elements to output the same waveform 219.

Figure 4:
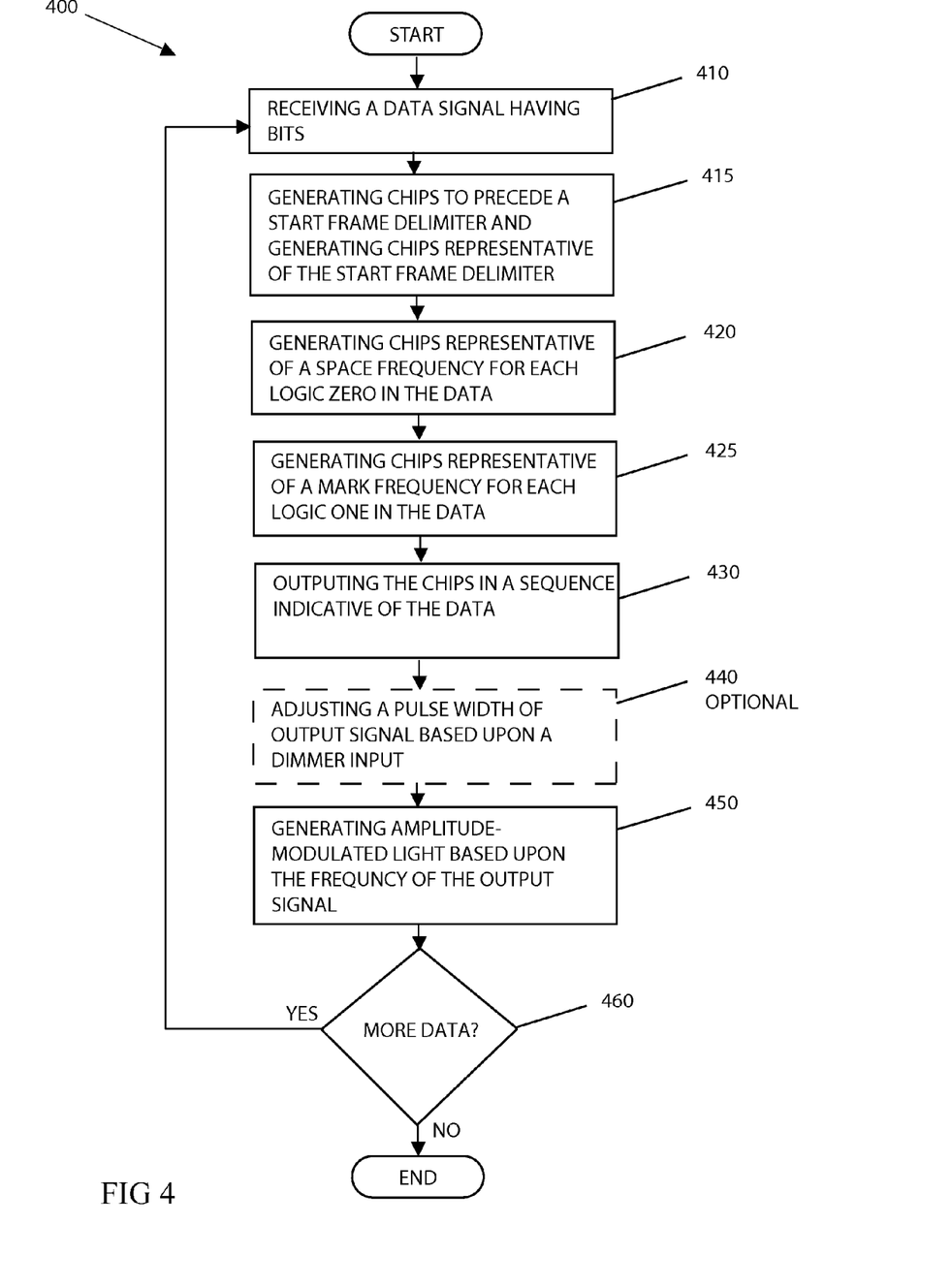
FIG. 4 illustrates a flow chart of an embodiment to transmit data by varying a modulation frequency of an amplitude-modulated light source.

FIG. 4 illustrates a flow chart 400 of an embodiment to transmit data by varying a modulation frequency of an amplitude-modulated light source. The embodiment involves transmission of data via a light source such as is described with respect to FIGS. 1-3. Flow chart 400 begins with receiving, by chips logic, a data signal having bits with logical zeros and logical ones (element 410). In many embodiments, the chips logic may comprise part of the FSK modulator. In some embodiments, the FSK modulator may store the data in memory and repeatedly output the data to selection logic to repeatedly output the data over and over via the light source. Note that the light source may comprise any electromagnetic radiator that can be amplitude modulated.

The chips logic may generate chips to precede a start frame delimiter (SFD) and generate chips indicative of the SFD (element 415). In some embodiments, the SFD may be generated by the chips logic and not included in the data received from the source device.

The chips logic may generate chips representative of a space frequency in response to receipt of logical zeros in the data received from the source device (element 420) and generate chips indicative of the mark frequency in response to receipt of logical ones in the data received from the source device (element 425). In many embodiments, the chips may be stored in memory of the FSK modulator and repeatedly output at a chipping clock frequency in a sequence that is indicative of the data, such as the identification number of the associated light source, to generate a digital waveform (element 430).

The waveform may be output or transmitted to a digital-to-analog converter that may be designed to convert the waveform into an analog waveform to switch between on and off states of the light source. As an optional feature, the digital-to-analog converter may adjust the pulse-width of the analog signal based upon a dimmer input to adjust the duty cycle of the signal (element 440). The digital-to-analog converter may generate an amplitude modulated signal centered around a frequency setting that is frequency modulated based upon the waveform received from the FSK modulator to transmit the data via a light source. The analog signal is applied to the light source such as an LED light source and the data is transmitted to a receiving device. In many embodiments, the FSK modulator may repeatedly transmit the same chips continuously or periodically in sets of repeated transmissions. In some embodiments, the chips logic may receive a new set of data to transmit from the light source (element 460) and the process may begin again at element 410.

Figure 5:
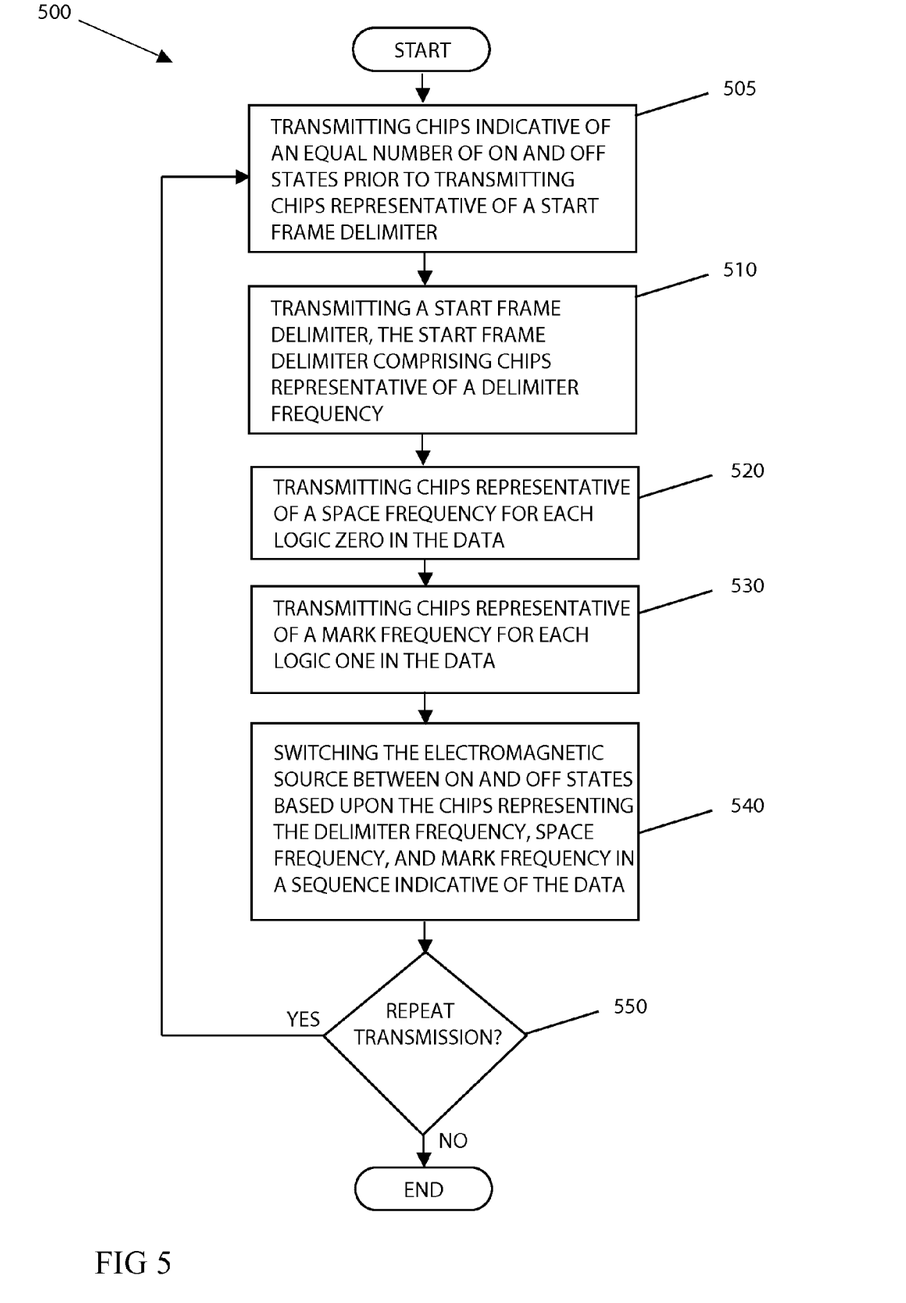
FIG. 5 illustrates a flow chart of an embodiment to transmit data by varying a modulation frequency of an amplitude-modulated electromagnetic radiator.

FIG. 5 illustrates a flow chart 500 of an embodiment to transmit data by varying a modulation frequency of an amplitude-modulated light source. Flow chart 500 begins with a frequency-shift keying (FSK) modulator transmitting chips indicative of an equal number of on and off states prior to transmitting chips representative of a start frame delimiter (SFD) (element 505). For instance, the FSK modulator may receive and store data from a source device and then transmit the chips at a chipping clock frequency that are representative of the data in a sequence that can be decoded to determine the data by a receiving device. The FSK modulator may precede an SFD with the equal number of on and off state chips followed by transmission of the SFD, which comprises chips representative of a start frame delimiter frequency (element 510).

After transmission of the SFD, the FSK modulator may transmit chips representative of a space frequency to represent logical zeros (element 520) and transmit chips representative of a mark frequency to represent logical ones (element 530). For instance, the FSK modulator may serially output chips at the chipping clock frequency in a waveform to a digital-to-analog converter (DAC) and the DAC may switch the electromagnetic radiator such as a light source between on and off states based upon the chips representing the delimiter frequency, space frequency, and mark frequency in a sequence indicative of the data (element 540). Switching the electromagnetic radiator may involve amplitude modulation of the power applied to the electromagnetic radiator at a rate that is beyond a perceivable rate to a human eye and modifying the rate based upon the chips representing the delimiter frequency, space frequency, and mark frequency in a sequence indicative of the data such that a receiving device can identify the frequencies of modulation of the electromagnetic radiator to decode the data.

The FSK modulator may output the waveform to modulate the frequency of the amplitude modulation of the electromagnetic radiator and then determine whether to repeat the transmission of the waveform. In many embodiments, the FSK modulator may repeat the transmission of the waveform, continually repeating the transmission of the data via the electromagnetic radiator. In further embodiments, the repetition may continue for periods of time, stop for a period of time, and then continue for additional periods of time.

The following examples pertain to further embodiments. One example comprises a method of generating a waveform for frequency shift keying data via an electromagnetic radiator. The method may involve processing the data to determine chips indicative of the waveform. The processing the data comprises selecting chips indicative of the bits of the data. The chips are indicative of on and off states of the electromagnetic radiator. The method may involve the processing, wherein the processing comprises: generating a start frame delimiter, the start frame delimiter comprising chips representative of a delimiter frequency; generating chips representative of a space frequency for each logic zero in the data; and generating chips representative of a mark frequency for each logic one in the data, wherein the direct current (DC) average value of the waveform is zero. The method may also involve outputting the chips representative of the delimiter frequency, space frequency, and mark frequency in memory in a sequence indicative of the data.

In some embodiments, the method may further comprise generating chips indicative of an equal number of on and off states to precede the start frame delimiter. In some embodiments of the method, processing the data to determine the chips indicative of the waveform comprises processing the data to determine chips for output at chipping frequency and based upon an anticipated frame rate of a receiving device. In further embodiments of the method, processing the data to determine chips comprises changing the frequencies associated with the chips at zero crossings of the waveform. In some embodiments of the method, processing the data to determine chips comprises determining an even number of chips for each cycle for each of the frequencies of the waveform. In further embodiments of the method, processing the data to determine chips comprises determining chips for at least four frames to represent the start frame delimiter. And, in some embodiments of the method, processing the data to determine chips comprises determining an even integer relationship between each signaling frequency and the chip rate frequency.

At least one computer program product for generating a waveform for frequency shift keying data via an electromagnetic radiator, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises a program product of generating a waveform for frequency shift keying data via an electromagnetic radiator. The program product may comprise a storage medium comprising instructions to be executed by a processor-based device, wherein the instructions, when executed by the processor-based device, perform operations. The operations comprise processing the data to determine chips indicative of the waveform. The processing the data comprises selecting chips indicative of the bits of the data. The chips are indicative of on and off states of the electromagnetic radiator. The operations may involve the processing, wherein the processing comprises: generating a start frame delimiter, the start frame delimiter comprising chips representative of a delimiter frequency; generating chips representative of a space frequency for each logic zero in the data; and generating chips representative of a mark frequency for each logic one in the data, wherein the direct current (DC) average value of the waveform is zero. The operations may also involve outputting the chips representative of the delimiter frequency, space frequency, and mark frequency in memory in a sequence indicative of the data.

In some embodiments, the operations may further comprise generating chips indicative of an equal number of on and off states to precede the start frame delimiter. In some embodiments, processing the data to determine the chips indicative of the waveform comprises processing the data to determine chips for output at chipping frequency and based upon an anticipated frame rate of a receiving device. In further embodiments, processing the data to determine chips comprises changing the frequencies associated with the chips at zero crossings of the waveform. In some embodiments, processing the data to determine chips comprises determining an even number of chips for each cycle for each of the frequencies of the waveform. In further embodiments, processing the data to determine chips comprises determining chips for at least four frames to represent the start frame delimiter. And, in some embodiments, processing the data to determine chips comprises determining an even integer relationship between each signaling frequency and the chip rate frequency.

One example comprises a method of frequency shift keying data in a waveform via an electromagnetic radiator. The method may involve transmitting chips indicative of the waveform, the chips being indicative of the bits of the data, wherein the chips are indicative of on and off states of the electromagnetic radiator. Processing the data comprises transmitting a start frame delimiter, the start frame delimiter comprising chips representative of a delimiter frequency; transmitting chips representative of a space frequency for each logic zero in the data; and transmitting chips representative of a mark frequency for each logic one in the data; wherein the direct current (DC) average value of the waveform is zero. The method may also involve switching the electromagnetic radiator between on and off states based upon the chips representing the delimiter frequency, space frequency, and mark frequency in a sequence indicative of the data.

In some embodiments, the method may further comprise transmitting chips indicative of an equal number of on and off states prior to transmitting chips representative of the start frame delimiter. In some embodiments of the method, transmitting the chips indicative of the waveform comprises transmitting the chips at a chipping frequency. In further embodiments of the method, transmitting the chips indicative of the waveform comprises changing the frequencies associated with the chips at zero crossings of the waveform. In some embodiments of the method, transmitting the chips indicative of the waveform comprises transmitting an even number of chips for each cycle for each of the frequencies of the waveform. In further embodiments of the method, transmitting the chips indicative of the waveform comprises transmitting chips for at least four frames to represent the start frame delimiter. And, in some embodiments of the method, transmitting the chips indicative of the waveform comprises transmitting an even integer relationship between each signaling frequency and the chip rate frequency.

At least one computer program product of frequency shift keying data in a waveform via an electromagnetic radiator, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises a program product of frequency shift keying data in a waveform via an electromagnetic radiator. The program product may comprise a storage medium comprising instructions to be executed by a processor-based device, wherein the instructions, when executed by the processor-based device, perform operations. The operations comprise transmitting chips indicative of the waveform, the chips being indicative of the bits of the data, wherein the chips are indicative of on and off states of the electromagnetic radiator. The transmitting the data comprises selecting chips indicative of the bits of the data. The chips are indicative of on and off states of the electromagnetic radiator. The operations of transmitting may involve transmitting a start frame delimiter, the start frame delimiter comprising chips representative of a delimiter frequency; transmitting chips representative of a space frequency for each logic zero in the data; and transmitting chips representative of a mark frequency for each logic one in the data; wherein the direct current (DC) average value of the waveform is zero. The operations may also involve switching the electromagnetic radiator between on and off states based upon the chips representing the delimiter frequency, space frequency, and mark frequency in a sequence indicative of the data.

In some embodiments, the operations may further comprise transmitting chips indicative of an equal number of on and off states prior to transmitting chips representative of the start frame delimiter. In some embodiments, transmitting the chips indicative of the waveform comprises transmitting the chips at a chipping frequency. In further embodiments, transmitting the chips indicative of the waveform comprises changing the frequencies associated with the chips at zero crossings of the waveform. In some embodiments, transmitting the chips indicative of the waveform comprises transmitting an even number of chips for each cycle for each of the frequencies of the waveform. In further embodiments, transmitting the chips indicative of the waveform comprises transmitting chips for at least four frames to represent the start frame delimiter. And, in some embodiments, transmitting the chips indicative of the waveform comprises transmitting an even integer relationship between each signaling frequency and the chip rate frequency.

Another example comprises an apparatus of frequency shift keying data in a waveform via an electromagnetic radiator. The apparatus may comprise chips logic to transmit chips indicative of the waveform, the chips being indicative of the bits of the data, wherein the chips are indicative of on and off states of the electromagnetic radiator. The transmission of the chips indicative of the waveform comprises: transmission of a start frame delimiter, the start frame delimiter comprising chips representative of a delimiter frequency; transmission of chips representative of a space frequency for each logic zero in the data; and transmission of chips representative of a mark frequency for each logic one in the data; wherein the direct current (DC) average value of the waveform is zero. The apparatus may also comprise a digital-to-analog converter coupled with chips logic to generate an analog signal to switch the electromagnetic radiator between on and off states based upon the chips representing the delimiter frequency, space frequency, and mark frequency in a sequence indicative of the data.

In some embodiments, the apparatus may further comprise a clock source to generate a clock signal at a chipping frequency. In some embodiments, the chips logic comprises logic to transmit chips indicative of an equal number of on and off states prior to transmission of chips representative of the start frame delimiter. In some embodiments, the chips logic comprises logic to change the frequencies associated with the chips at zero crossings of the waveform. In further embodiments, the chips logic comprises logic to transmit an even number of chips for each cycle for each of the frequencies of the waveform. In further embodiments, the chips logic comprises logic to transmit chips for at least four frames to represent the start frame delimiter. In further embodiments, the frequency logic comprises logic to transmit an even integer relationship between each signaling frequency and the chip rate frequency.

Another embodiment is implemented as a program product for implementing systems and methods described with reference to FIGS. 1-5. Embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

The logic as described above may be part of the design for an integrated circuit chip. The integrated circuit chip design is created in a graphical computer programming language, and stored in a computer storage medium (such as a disk, tape, physical hard drive, or virtual hard drive such as in a storage access network). If the designer does not fabricate chips or the photolithographic masks used to fabricate integrated circuit chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the integrated circuit chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the integrated circuit chip is mounted in a single integrated circuit chip package (such as a plastic carrier, with leads that are affixed to a motherboard or other higher level carrier) or in a multichip package (such as a ceramic carrier that has either or both surface interconnections or buried interconnections). In any case, the integrated circuit chip is then integrated with other integrated circuit chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates generating a waveform based upon data to transmit the data by varying a modulation frequency of amplitude-modulation of an electromagnetic radiator to generate, e.g., light, and receiving the data by undersampling frequencies of modulation of the, e.g., light. It is understood that the form of the embodiments shown and described in the detailed description and the drawings are to be taken merely as examples. It is intended that the following claims be interpreted broadly to embrace all variations of the example embodiments disclosed.

Although the present disclosure has been described in detail for some embodiments, it should be understood that various changes, substitutions, and alterations could be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus of a wireless communication device configured for visible-light communications (VLC), the apparatus comprising:
    memory; and processing circuitry, the processing circuitry comprising an on-off keying (OOK) encoder, the processing circuitry configured to:
    encode bits of a frame of data in accordance with an OOK technique, the frame of data encoded to include a start frame delimiter followed by data in which a first logical level is represented by a first on-off keying (OOK) frequency and a second logical level is represented by a second OOK frequency, the first OOK frequency being an integer multiple of a sampling frequency for decoding in accordance with under-sampled frequency shift on-off keying (UFSOOK), the second OOK frequency being an integer plus half multiple of the sampling frequency;
    during periods of data transmission:
    configure a light source to switch between on and off states for two samples at a third OOK frequency followed by two samples at the second OOK frequency to convey the start frame delimiter; and configure the light source to switch between on and off states at either the first OOK frequency or the second OOK frequency to convey each bit of the frame of data, each bit being conveyed by two samples;

wherein the processing circuitry is to configure the light source to switch between on and off states in accordance with a duty cycle during the periods of data transmission and during idle periods.

2. The apparatus of claim 1 wherein the processing circuitry is further configured to change the duty cycle to change a perceived intensity.

3. The apparatus of claim 2 wherein the processing circuitry is further configured to change to duty cycle to change the perceived intensity during the periods of data transmission and during idle periods to maintain a same perceived intensity during the periods of data transmission and during the idle periods.

4. The apparatus of claim 3 wherein the processing circuitry is further configured to change the duty cycle without changing the first, second or third OOK frequencies.

5. The apparatus of claim 1, wherein one of the idle periods precedes the start fame delimiter.

6. The apparatus of claim 5 wherein prior to the start frame delimiter, the processing circuitry to configure the light source to switch between and equal number of on and off states to precede the start frame delimiter.

7. The apparatus of claim 1 wherein the third OOK frequency comprises a frequency higher than the second OOK frequency.

8. The apparatus of claim 7, wherein the first and second OOK frequencies are greater than a persistence of a human eye.

9. The apparatus of claim 8 wherein the first logical level corresponds to a logical zero and the second logical level corresponds to a logical one.

10. The apparatus of claim 8 wherein the first logical level corresponds to a logical one and the second logical level corresponds to a logical zero.

11. The apparatus of claim 8 wherein the data is encoded on visible light in which the first logical level corresponds to an even number of cycles of the on and off states per bit transmitted for one bit period, and a second logical level corresponds to an odd number of cycles of the on and off stations per bit transmitted for one bit period.

12. The apparatus of claim 8 wherein the data is encoded on visible light in which the first logical level corresponds to an odd number of cycles of the on and off states per bit transmitted for one bit period, and a second logical level corresponds to an even number of cycles of the on and off stations per bit transmitted for one bit period.

13. The apparatus of claim 8 wherein the on and off states comprise on and off cycles of visible light.

14. The apparatus of claim 8 wherein the first and second OOK frequencies are greater than 100 Hz.

15. The apparatus of claim 1 wherein the sampling frequency corresponds to a sample rate, and wherein each bit of the output data is represented by at least two of the samples to provide a bit rate that is less than or equal to half the sample rate.

16. The apparatus of claim 15 wherein the frame is configured in accordance with an IEEE 802.15 standard for wireless visible light communication (VLC).

17. The apparatus of claim 1 further comprising the light source, the light source comprising a light-emitting diode (LED).

18. The apparatus of claim 1 wherein the processing circuitry comprises a frequency-shift keying (FSK) modulator to encode the bits.

19. A non-transitory computer-readable storage medium that stores instructions for execution by processing circuitry of a wireless device configured for visible-light communications, the instructions to configure the wireless communication device to perform operations to:

encode bits of a frame of data in accordance with an OOK technique, the frame of data encoded to include a start frame delimiter followed by data in which a first logical level is represented by a first on-off keying (OOK) frequency and a second logical level is represented by a second OOK frequency, the first OOK frequency being an integer multiple of a sampling frequency for decoding in accordance with under-sampled frequency shift on-off keying (UFSOOK), the second OOK frequency being an integer plus half multiple of the sampling frequency;

during periods of data transmission:

configure a light source to switch between on and off states for two samples at a third OOK frequency followed by two samples at the second OOK frequency to convey the start frame delimiter; and configure the light source to switch between on and off states at either the first OOK frequency or the second OOK frequency to convey each bit of the frame of data, each bit being conveyed by two samples;

wherein the processing circuitry is to configure the light source to switch between on and off states in accordance with a duty cycle during the periods of data transmission, and during idle periods, the processing circuitry is to configure the light source to switch between on and off states in accordance with the duty cycle that is used during the periods of data transmission.

20. The apparatus of claim 19 wherein the processing circuitry is further configured to change to duty cycle to change a perceived intensity during the periods of data transmission and during idle periods to maintain a same perceived intensity during the periods of data transmission and during the idle periods.

21. The apparatus of claim 20, wherein one of the idle periods precedes the start fame delimiter, and wherein prior to the start frame delimiter, the processing circuitry to configure the light source to switch between and equal number of on and off states to precede the start frame delimiter.

22. A method of conveying data by visible-light communication comprising:

encoding bits of a frame of data in accordance with an OOK technique, the frame of data encoded to include a start frame delimiter followed by data in which a first logical level is represented by a first on-off keying (OOK) frequency and a second logical level is represented by a second OOK frequency, the first OOK frequency being an integer multiple of a sampling frequency for decoding in accordance with under-sampled frequency shift on-off keying (UFSOOK), the second OOK frequency being an integer plus half multiple of the sampling frequency;

during periods of data transmission:

configuring a light source to switch between on and off states for two samples at a third OOK frequency followed by two samples at the second OOK frequency to convey the start frame delimiter; and configuring the light source to switch between on and off states at either the first OOK frequency or the second OOK frequency to convey each bit of the frame of data, each bit being conveyed by two samples;

wherein the processing circuitry is to configure the light source to switch between on and off states in accordance with a duty cycle during the periods of data transmission and during idle periods.

* * * * *

UNITED STATES PATENT AND TRADEMARK OFFICE
CERTIFICATE OF CORRECTION

PATENT NO. : 9,548,815 B2
APPLICATION NO. : 15/131661
DATED : January 17, 2017
INVENTOR(S) : Roberts et al.

Page 1 of 1

It is certified that error appears in the above-identified patent and that said Letters Patent is hereby corrected as shown below:

In the Claims

In Column 23, Line 24, in Claim 5, delete "fame" and insert --frame-- therefor

In Column 24, Line 45, in Claim 21, delete "fame" and insert --frame-- therefor

Signed and Sealed this
Twenty-sixth Day of May, 2020

Andrei Iancu
*Director of the United States Patent and Trademark Office*